United States Patent
Liu et al.

(10) Patent No.: US 10,212,217 B2
(45) Date of Patent: Feb. 19, 2019

(54) METHOD AND APPARATUS FOR DATA TRANSMISSION IN A DISTRIBUTED STORAGE SYSTEM

(71) Applicant: Tencent Technology (Shenzhen) Company Limited, Shenzhen, Guangdong (CN)

(72) Inventors: Yang Liu, Guangdong (CN); Fangming Zou, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 407 days.

(21) Appl. No.: 15/009,413

(22) Filed: Jan. 28, 2016

(65) Prior Publication Data

US 2016/0150001 A1 May 26, 2016

Related U.S. Application Data

(63) Continuation of application No. PCT/CN2014/092423, filed on Nov. 28, 2014.

(30) Foreign Application Priority Data

Dec. 3, 2013 (CN) .......................... 2013 1 06424845

(51) Int. Cl.
- *G06F 21/62* (2013.01)
- *H04L 29/08* (2006.01)
- *H04L 9/08* (2006.01)

(52) U.S. Cl.
CPC .......... *H04L 67/1002* (2013.01); *G06F 21/62* (2013.01); *H04L 67/1023* (2013.01);
(Continued)

(58) Field of Classification Search
CPC . G06F 21/60; G06F 21/6218; H04L 63/0428; H04L 67/1097; H04L 9/08
See application file for complete search history.

(56) References Cited

U.S. PATENT DOCUMENTS

| | | | | |
|---|---|---|---|---|
| 9,378,380 | B1 * | 6/2016 | Reid | G06F 21/602 |
| 2009/0296942 | A1 * | 12/2009 | Burckart | H04L 9/3236 |
| | | | | 380/282 |

(Continued)

FOREIGN PATENT DOCUMENTS

| | | |
|---|---|---|
| CN | 101399765 A | 4/2009 |
| CN | 101771715 A | 7/2010 |

(Continued)

OTHER PUBLICATIONS

Office Action dated Nov. 3, 2017 for Chinese Application No. 2013106424845, 8 pages.

(Continued)

*Primary Examiner* — Jeong S Park
(74) *Attorney, Agent, or Firm* — Brinks Gilson & Lione

(57) ABSTRACT

A data transmission method and apparatus avoids uneven loading of stored data, supports allocation of storage spaces with load balancing, and supports fast access to data. The method may include receiving, by a distributed storage system, data and a corresponding data key sent by a client. Nodes are allocated to the data according to load conditions of nodes in the distributed storage system. The data is stored in the corresponding nodes. A constructed key is generated for the data, which includes the data key and node routing information corresponding to a location where the data is stored. The constructed key is returned to the client. The client uses the constructed key to acquire the stored data. The distributed storage system receives the constructed key, (Continued)

retrieves the stored data based on the routing information in the constructed key and sends the data to the client.

13 Claims, 10 Drawing Sheets

(52) U.S. Cl.
CPC ...... *H04L 67/1097* (2013.01); *G06F 21/6218* (2013.01); *H04L 9/08* (2013.01)

(56) References Cited

U.S. PATENT DOCUMENTS

| | | | | |
|---|---|---|---|---|
| 2011/0022642 | A1* | 1/2011 | deMilo | G06F 17/30082 707/805 |
| 2012/0254689 | A1* | 10/2012 | Resch | H04L 9/085 714/763 |
| 2013/0091284 | A1* | 4/2013 | Rothschild | G06F 3/067 709/226 |
| 2013/0103729 | A1 | 4/2013 | Cooney et al. | |
| 2013/0305039 | A1* | 11/2013 | Gauda | G06F 21/6218 713/153 |
| 2013/0346537 | A1* | 12/2013 | Fitzpatrick | H04L 67/1097 709/213 |

FOREIGN PATENT DOCUMENTS

| | | |
|---|---|---|
| CN | 101840417 A | 9/2010 |
| CN | 101984632 A | 3/2011 |
| CN | 102567495 A | 7/2012 |
| CN | 102968498 A | 3/2013 |

OTHER PUBLICATIONS

International Search Report and Written Opinion issued in corresponding application PCT/CN2014/092,423, dated Feb. 17, 2015, pp. 1-7.

* cited by examiner

METHOD AND APPARATUS FOR DATA TRANSMISSION IN A DISTRIBUTED STORAGE SYSTEM

CROSS REFERENCE

This application is a continuation of International Application No. PCT/CN2014/092423, filed on Nov. 28, 2014, which claims priority to Chinese Patent Application No. 2013106424845, filed on Dec. 3, 2013 with State Intellectual Property Office of People's Republic of China, entitled "METHOD AND APPARATUS FOR DATA TRANSMISSION," both of which are hereby incorporated by reference in their entirety.

BACKGROUND

Technical Field

The present disclosure relates to computer communications technologies, and particularly to a method and apparatus for data transmission.

Related Art

A traditional acentric distributed storage system commonly uses a consistent hashing algorithm for allocating storage space and searching for data.

A range of output generated by performing a consistent hashing algorithm on data keys may map to a fixed ring space (that is, the maximum output hash value may be close to the minimum output hash value). For data nodes, each node may be randomly assigned to a certain value, and a node's location in the ring space may be labeled so as to assign a range of hash values that each node is responsible for in storing data. Generally, each node is responsible for storage for hash values between the node value and some region in numbering areas between the node values. In storage space allocation and data query, consistent hashing may be directly performed on data keys to generate hash values, and nodes for storing data be allocated or located in a query based on the hash values corresponding to the data keys.

Such a method may achieve route storage, fast query and space allocation based on data keys that correspond to the data being stored and queried. However, as allocation of storage spaces is directly relevant to the data keys, the consistent hashing algorithm must depend on the data keys to randomly select storage nodes, which may result in unbalanced distribution of loads and storage of the data in the nodes.

SUMMARY

The present disclosure provides a method and apparatus for data transmission that can avoid uneven loading brought about by random allocation of storage nodes.

Some embodiments of the present disclosure provide a data transmission method, including: receiving, by a distributed storage system, data sent by a client and a key corresponding to the data. One or more storage nodes may be allocated to the data according to load conditions of storage nodes in the distributed storage system. The data may be stored in one or more of the storage nodes allocated to the data. A constructed key may be generated for the data, where the constructed key may comprise a structured key that may include the key corresponding to the data and node routing information corresponding to a location where the data is stored. The constructed key for the data may be returned to the client. The key corresponding to the data, which may be referred to as a data key, may be a key assigned to the data and may not include information about where the data is stored in the distributed storage system.

The client may comprise any suitable hardware and/or software that may be operable to communicate with one or more devices in the distributed storage system in accordance with an embodiment of the disclosure. For example, the client may comprise a user device or any suitable computing and/or communication system. However, the disclosure is not limited to any specific type of client device.

In another embodiment of the disclosure, a client may acquire data that is to be transmitted via a network to a distributed storage system with a key that corresponds to the data. The data and the key of the data may be sent to the distributed storage system. The distributed storage system may allocate one or more storage nodes to the data according to load conditions of nodes of the distributed storage system, and may store the data in one or more of the storage nodes allocated to the data. The distributed storage system may generate a constructed key for the data, where the constructed key may include the key corresponding to the data and node routing information corresponding to a location where the data is stored in the distributed storage system. The client may receive the constructed key that for the data from the distributed storage system.

Some embodiments of the disclosure include an apparatus for data transmission, which may be referred to as a device, a terminal or a node, for example. The data transmission apparatus may include one or more hardware processors comprising circuitry that may operate according to coded instructions that may be stored in a memory and/or may be executed as one or more modules that perform one or more functions or operations.

Some embodiments of the disclosure may include a data transmission apparatus that may operate in a distributed storage system. The distributed storage system data transmission apparatus may include a data receiving module that may receive data and a key corresponding to the data that may be sent by a client device. A node management module may allocate one or more storage nodes to the data according to load conditions of storage nodes in the distributed storage system. The node management module may store the data in one or more of the allocated storage nodes. A constructed key generation module may generate a constructed key for the data, where the constructed key may include the key corresponding to the data and node routing information corresponding to a location in the allocated storage nodes where the data is stored. A data returning module may return the constructed key for the data to the client.

Some embodiments of the present disclosure include a data transmission apparatus that operates as a client. The client apparatus may include a data acquisition module that is operable to acquire data that is to be transferred to the storage distribution system, and a key corresponding to the data. A data sending module may send the data and the key corresponding to the data to the distributed storage system where the distributed storage system may allocate one or more storage nodes to the data according to load conditions of storage nodes of the distributed storage system. The distributed storage system may store the data in one or more of the allocated storage nodes and may generate a constructed key for the data. The constructed key may include the key corresponding to the data and node routing information corresponding to a location where the data is stored in the one or more allocated storage nodes. A data receiving module of the client apparatus may receive the constructed key for the data returned from the distributed storage system.

In the data transmission methods and apparatus of the disclosure, storage nodes may be allocated, according to load conditions of storage nodes in a distributed storage system, to data that may be sent by a client. Use of data keys and hash values for data storage may be avoided, thereby eliminating problems of an uneven loading in a storage system. By actively constructing a new globally unique constructed key using actual node routing information based on prior data storage and keys corresponding to the stored data the methods of data storage and retrieval may be improved As a result, repeated data keys may be used where each key corresponds to different data without causing data conflicts. In addition, as the constructed key may include structured data, additional data information may be written into the constructed key, so that the client may obtain attributes of the data or system without having to transmit additional communications with the distributed storage system. Furthermore, the constructed key may also serve as a digital certificate for the client to subsequently read the data from the distributed storage system. Moreover, by including the node routing information within the constructed key, the storage system may quickly locate the data in the distributed storage system with fewer queries. Therefore, the data transmission methods and apparatus of the present disclosure may improve prior storage methods and avoid uneven loading. Storage space may be allocated with load balancing that supports fast access to stored data.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The present disclosure may be better understood with reference to the drawings and the detailed description, which include non-limiting and non-exhaustive embodiments of the present disclosure.

DETAILED DESCRIPTION

To further illustrate the technical means of the present disclosure for achieving intended objectives and effects thereof, various manners of implementation, structures, features and effects are described in detail in combination with the accompanying drawings.

Figure 1:
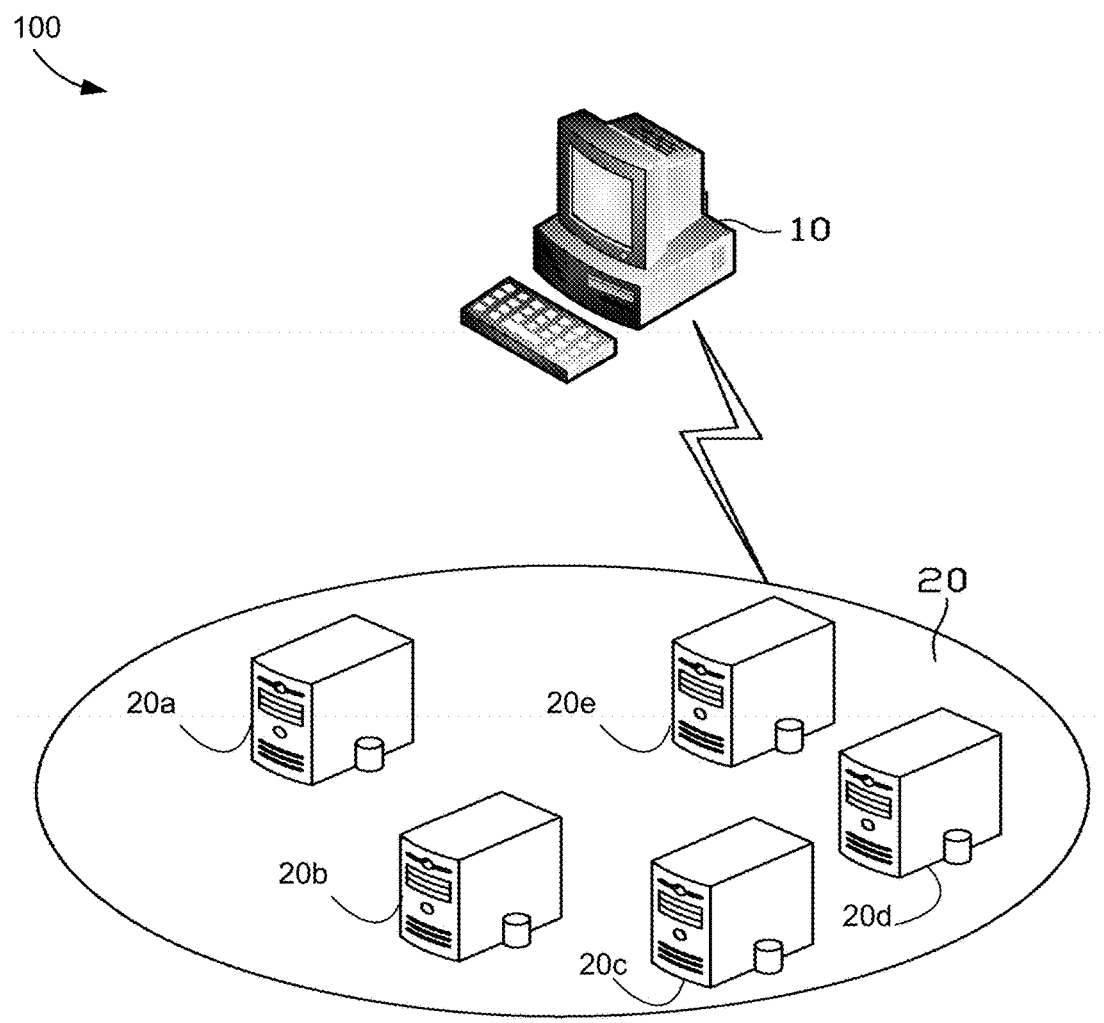
FIG. 1 is an example of an application environment for data transmission in accordance with an embodiment of the disclosure.

According to an embodiment of the present disclosure, methods of data transmission may be implemented between a client device and a distributed storage system. FIG. 1 is an example of an application environment for data transmission in accordance with an embodiment of the disclosure. Referring to FIG. 1, there is shown an application environment 100 including a client 10 and a distributed storage system 20. The distributed storage system 20 may comprise a plurality of nodes including 20a-20e.

The client 10 and the distributed storage system 20 may be communicatively coupled via one or more network, for example, through a wire-line, wireless and/or optical network which may include the Internet and/or one or more intranets. The client 10 may comprise any suitable hardware and/or software that may be operable to communicate with one or more devices 20a-20e in the distributed storage system 20 in accordance with an embodiment of the disclosure. For example, the client 10 may comprise a user device or any suitable computing and/or communication system.

The client 10 and the distributed storage system 20 are not limited to any specific type of device. For example, the client 10 may include a user terminal or a server device, which may be operable to perform data transmission methods in accordance with an embodiment of the disclosure.

The distributed storage system 20 may include a plurality of nodes 20a-20e, which may be operable to perform data transmission methods and data storage and/or processing in accordance with an embodiment of the disclosure. For example, the nodes 20a-20e may comprise a device such as a user terminal device or a server device. The client 10 device and the nodes 20a-20e in the distributed storage system 20 may comprise and/or have access to a memory and a hardware processor. The memory may be used for storing software programs and/or modules including program instructions for the methods and apparatus described in the present disclosure. The processors of the client 10 and/or the nodes 20a-20e may be operable to perform various functions, applications and data processing by executing the software programs and modules stored in the memory. That is, data transmission methods may be implemented by the client 10 node and/or the distributed storage system 20 nodes 20a-20e. The client 10 and/or the nodes 20a-20e may each comprise any suitable device, for example, a smart phone, a tablet PC, an e-book reader, a Moving Picture Experts Group Audio Layer III (MP3) player, a Moving Picture Experts Group Audio Layer IV (MP4) player, a portable laptop computer, a personal computer, a vehicle terminal and the like. However, the disclosure is not limited in this regard and the client 10 and the nodes 20a-20e may each include any suitable type of computing and/or communication device.

In operation, the client 10 may acquire data that is to be transmitted via a network to the distributed storage system 20 with a key that corresponds to the data. The data and the key of the data may be sent to the distributed storage system 20. The distributed storage system 20 may receive data and the key corresponding to the data sent by the client 10. The distributed storage system may allocate one or more of the storage nodes 20a-20e to the data according to load conditions of the nodes 20a-20e of the distributed storage system 20, and may store the data in one or more of the storage nodes 20a-20e that are allocated to the data. The distributed storage system 20 may generate a constructed key for the data, where the constructed key may include the key corresponding to the data and node routing information corresponding to a location where the data is stored in the distributed storage system 20. The constructed key for the data may be sent to the client 10. The client 10 may receive the constructed key for the data from the distributed storage system 20.

Moreover, the client 10 may send a data acquisition request to the distributed storage system 20. The data acquisition request may comprise the constructed key for the data. The distributed storage system 20 may read the data from one or more of the storage nodes 20a-20e according to the node routing information in the constructed key and may return the read data to the client 10.

Figure 2:
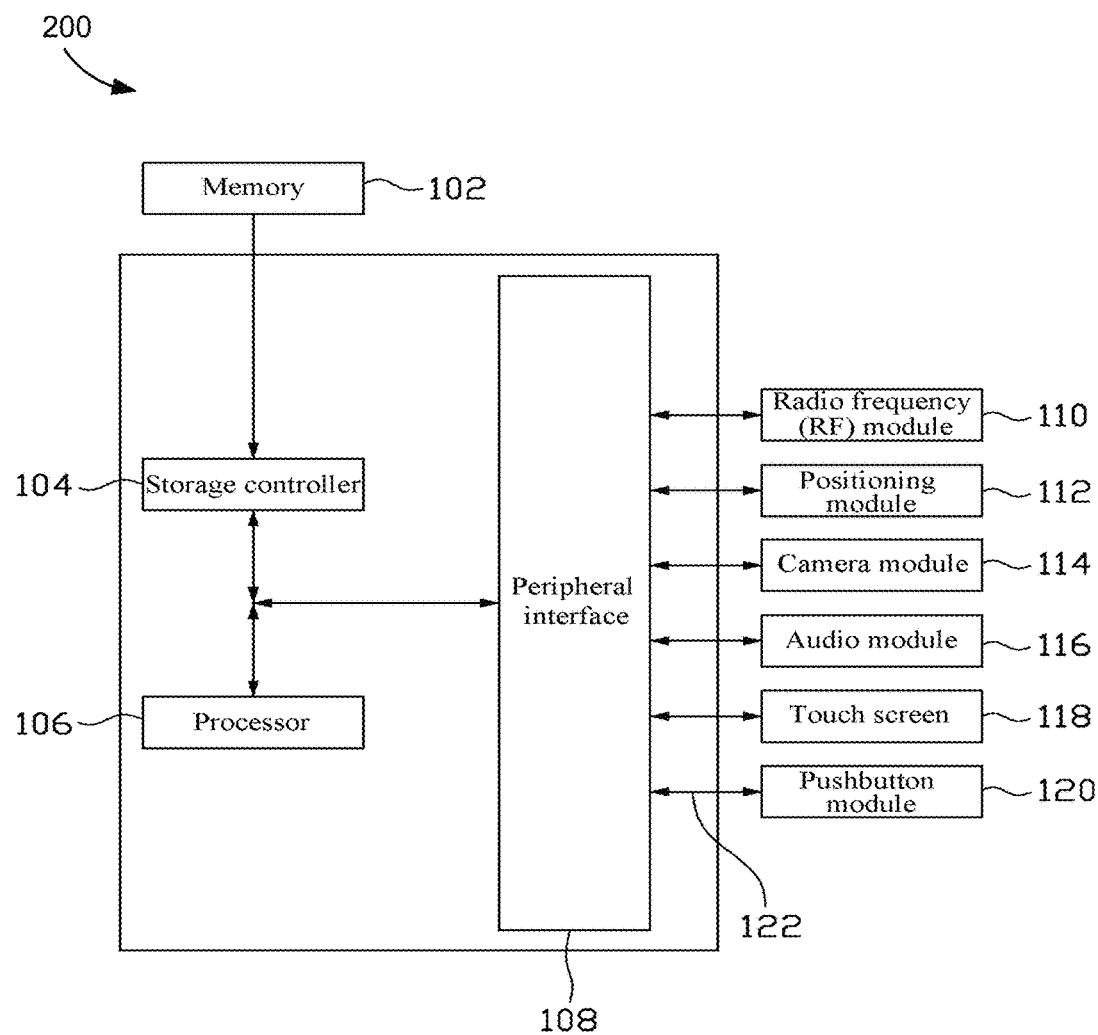
FIG. 2 is a structural block diagram of a user terminal in accordance with an embodiment of the disclosure.

FIG. 2 is a structural block diagram of a user terminal in accordance with an embodiment of the disclosure. As shown in FIG. 2, the user terminal 100 may comprise a plurality of components, for example, a memory 102, a storage controller 104, one or more processors 106, a peripheral interface 108, a radio frequency (RF) module 110, a location determination module 112, an image acquisition module 114, an audio module 116, a touch screen 118 and a pushbutton module 120. Two or more of the components 102, 104, 106, 108, 110, 112, 114, 116, 118 and 120 may be communicatively coupled and may communicate with each other through one or more communications buses and/or signal lines 122.

It may be understood that, the structure illustrated in FIG. 2 is merely exemplary, and the user terminal 100 may include more or fewer components, or may have configurations different from those illustrated in FIG. 2. The components and modules illustrated in FIG. 2 may be implemented by means of hardware, software or a combination of hardware and software.

The memory 102 may be used for storing software programs and/or software modules, for example, program instructions corresponding to the data transmission methods and apparatus described for embodiments of the present disclosure. The one or more processors 106 may perform various functions, applications and data processing in accordance with the disclosure by executing the software programs and software modules stored in the memory 102, for example, the data transmission methods and data storage methods.

The memory 102 may include, for example, a high-speed random access memory, and/or a nonvolatile memory, such as, one or more magnetic storage devices, a flash memory, or other nonvolatile solid-state memories. In some embodiments, the memory 102 may further include memories remotely disposed relative to the one or more processors 106. The remote memories may be communicatively coupled to the user terminal 100 through a network, for example. Examples of the network include, but are not limited to, the Internet, an intranet, a local area network (LAN), a mobile communications wireless network and any combination thereof. Access by the one or more processors 106 and other possible components to the memory 102 may be performed under control of the storage controller 104.

The peripheral interface 108 may couple various inputs or input devices to a central processing unit (CPU) of the one or more processors 106 and the memory 102. The one or more processors 106 may execute various software instructions stored in the memory 102 to perform various functions of the user terminal 100 and to perform data processing, for example.

In some embodiments, a single chip may include the peripheral interface 108, the one or more processors 106 and the storage controller 104, for example. In other embodiments, one or more of the peripheral interface 108, the one or more processors 106 and the storage controller 104 may reside on one or more separate chips.

The RF module 110 may receive and send electromagnetic waves and convert between the electromagnetic waves and electric signals, so as to communicate via a communications network with other devices. The RF module 110 may include various circuit elements for executing the communication functions, for example, an antenna, an RF transceiver, a digital signal processor, an encryption and/or decryption chip, a subscriber identity module (SIM) card, a memory and the like. The RF module 110 may communicate with various networks, for example, the Internet, an intranet or a wireless network, or communicate with other devices through a wireless network. The wireless network may include a cellular telephone network, a wireless LAN or a metropolitan area network (MAN), for example. The wireless network may use various communications standards, protocols or technologies, which may include, but are not limited to, a Global System for Mobile Communication (GSM), an Enhanced Data GSM Environment (EDGE), Wideband Code Division Multiple Access (W-CDMA), Code division Multiple Access (CDMA), Time Division Multiple Access (TDMA), Bluetooth, Wireless Fidelity (WiFi) (for example, American Institute of Electrical and Electronics Engineers (IEEE) Standards IEEE 802.11a, IEEE 802.11b, IEEE 802.11g and/or IEEE 802.11n), Voice over Internet Protocol (VoIP), Worldwide Interoperability for Microwave Access (Wi-Max), other protocols that may be utilized for mailing, real-time messaging, short messages, and any other suitable communications protocols. The system is not limited with regard to any specific type of communication technology and may even utilize protocols that have not yet been developed.

The location determination module 112 may be operable to acquire a current position of the user terminal 100. Examples of the location determination module 112 may include, but are not limited to, a global positioning system (GPS) and positioning technologies based on a wireless LAN or a mobile communications network.

The image acquisition module 114 may be operable to take photos or videos images. The photos or videos may be stored in the memory 102, and may be sent via a network by means of the RF module 110.

The audio module 116 may provide an audio interface to a user that may include one or more microphones, one or more loudspeakers and an audio circuit, for example. The audio circuit may receive sound data from the peripheral interface 108, convert the sound data to electrical information, and transmit the electrical information to the loudspeakers. The loudspeakers may convert the electrical information to sound waves that human ears can perceive. The audio circuit may further receive electrical information from the microphones, convert the electrical information to sound data, and transmit the sound data to the peripheral interface 108 for further processing. Audio data may be acquired from the memory 102 or by means of the RF module 110. In addition, the audio data may also be stored in the memory 102 or may be sent by means of the RF module 110. In some examples, the audio module 116 may further include a headphone jack used for providing an audio interface to a headphone or other devices.

The touch screen 118 may simultaneously provide an output and input interface between the user terminal 100 and the user. Specifically, the touch screen 118 displays video output for the user, and content of the video output may include text, graphics, video or any combination thereof. Some output results correspond to some user interface objects. The touch screen 118 may further receive input from the user, for example, clicking, sliding or other gestures by the user, so as to prompt user interface objects to respond to the input. Technologies used for detecting user input may be resistive, capacitive or any other suitable touch detection technologies. A specific example of a display unit of the touch screen 118 may include, but is not limited to, a liquid crystal display or a light-emitting polymer display.

The pushbutton module 120 may also provide an interface through which the user may input information to the user terminal 100, and the user may press different keys to make the user terminal 100 execute different functions.

Figure 3:
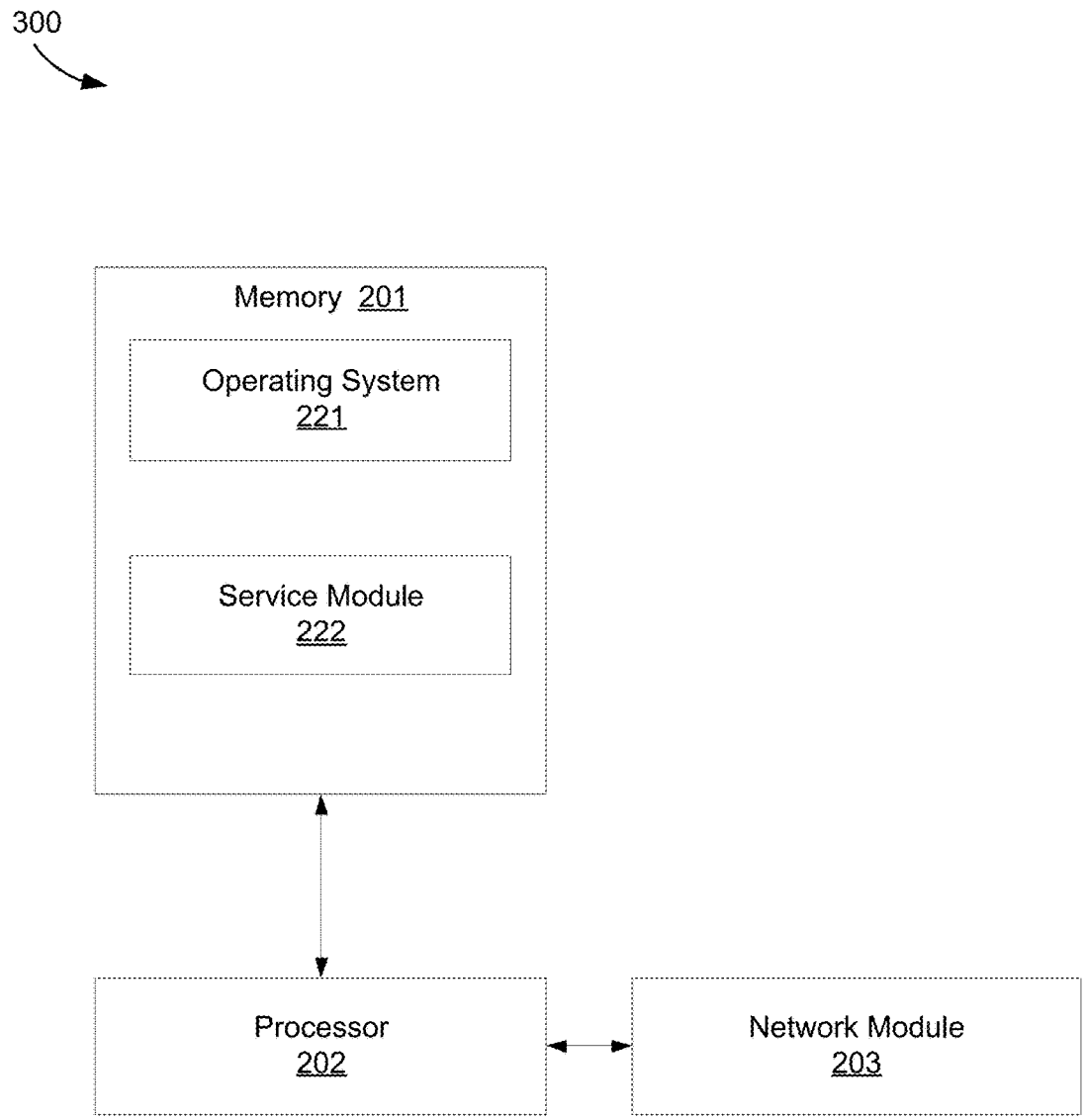
FIG. 3 is a structural block diagram of a server in accordance with an embodiment of the disclosure.

FIG. 3 is a structural block diagram of a server in accordance with an embodiment of the disclosure. As shown in FIG. 3, the server 200 may include a memory 201, one or more processors 202 and a network module 203. It may be understood that, the structure illustrated in FIG. 3 is merely exemplary, and is a not meant to limit the structure of the client 10 or the distributed storage system 20 nodes 20a-20e. For example, the nodes in the client 10 or the distributed storage system 20 may further include more or fewer components than those illustrated in FIG. 3, or may have configurations different from those illustrated in FIG. 3.

The memory 201 may be used for storing software programs and modules that may include instructions corresponding to the data transmission methods and apparatus of the present disclosure. The one or more processors 202 may perform various functions, applications and data processing by executing the software programs and modules stored in the memory 201 to implement the data transmission methods in accordance with embodiments of the present disclosure. The memory 201 may include a high-speed random access memory, and may further include a nonvolatile memory, for example, one or more magnetic storage apparatus, flash memory, or other nonvolatile solid-state memories. In some embodiments, the memory 201 may further include memory devices remotely disposed relative to the one or more processors 202. The remote memories may be communicatively coupled to the server 200 over a network.

The network module 203 is used for receiving and sending network signals. The network signals may include wireless signals or wire-line signals. The network module 203 may include, for example, a processor, a random memory, a converter, a crystal oscillator and other elements.

The software programs and modules may further include an operating system 221 and a service module 222. The operating system 221 may be, for example, LINUX, UNIX or Windows, which may include software components and/or drives for managing system tasks. For example, the operating system 221 and/or the service module 22 may perform memory management, storage device control, power source management and the like. The operating system 221 and/or service module 222 may communicate with various hardware or software components, thereby improving running environments of other software components. The service module 222 may run on the basis of the operating system 221 and may monitor requests from the network by means of a network service of the operating system 211. The service module 222 may complete corresponding data processing according to the request, and may return a processing result to the client 10. That is to say, the service module 222 may be used for providing network services to the client 10.

The term "data key" may refer to, in a traditional key-value storage system, a data identification provided by a client to a storage system when data storage is requested, and may be used for uniquely identifying data to be stored in the storage system. It can serve as a certificate for the client to read the data. The term "constructed key" may refer to a new data identification, constructed according to a key of the data and node routing information corresponding to the data. The constructed key may replace the traditional data key and may serve as a certificate for the client 10 to read data.

Figure 4:
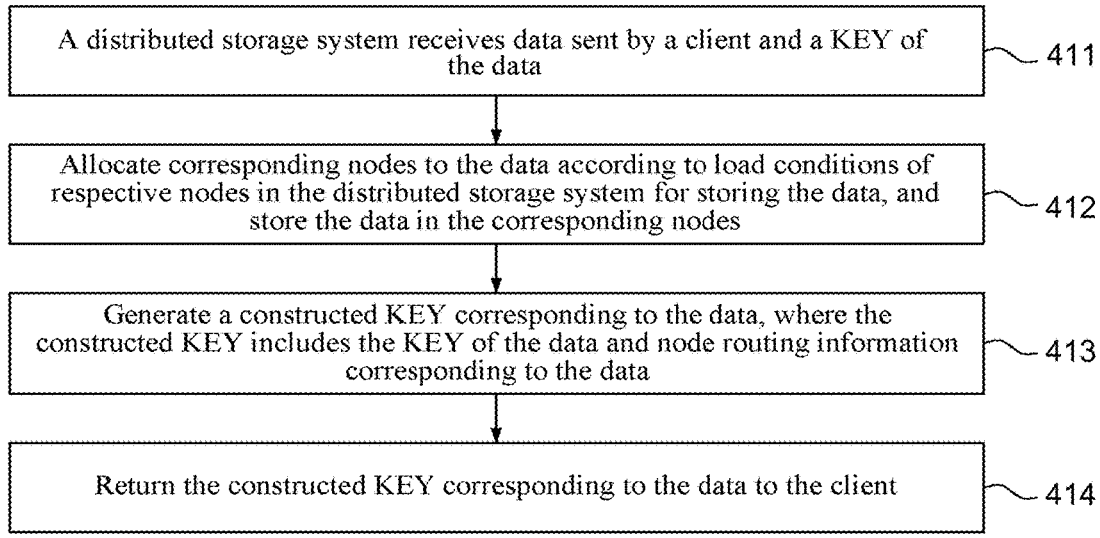
FIG. 4 is a flowchart of a method of data transmission in accordance with an embodiment of the disclosure.

FIG. 4 is a flowchart of exemplary steps for data transmission in accordance with an embodiment of the disclosure. The exemplary steps include a processing procedure performed on the side of the distributed storage system 20 when the client 10 uploads data to the distributed storage system 20.

The exemplary steps may begin at step 411. In step 411, the distributed storage system 20 may receive data and a key corresponding to the data, sent by the client 10. In the distributed storage system 20, a node of the nodes 20a-20e, which may be an access node, may receive the data and the key corresponding to the data, sent by the client 10.

In step 412, one or more of the nodes 20a-20e may be allocated to the data according to load conditions of nodes in the distributed storage system that are used for storing the data, for example, the nodes 20a-20e. The data may be stored in the one or more of the allocated nodes.

The distributed storage system 20 may periodically synchronize the load conditions of the nodes in the distributed storage system, for example, the nodes 20a-20e that may be used for storing data. When the data sent by the client 10, and the key corresponding to the data are received, the node receiving the data, for example, the access node, may select, according to the real-time load conditions of the nodes in the distributed storage system 20, which node to store the data in, and may store the data in the selected node. In some systems, selected node may be referred to as an optimal node. In this manner, problems that occur when the allocation of storage spaces is over-dependent on a data key, as in traditional data storage technology, are avoided.

Real-time load conditions may refer to indexes obtained by the nodes in the distributed storage system that are used for storing data, for example, the nodes 20a-20e. The indexes may be obtained at a certain point in time, and may be based on remaining capacity in a storage space, for example, available space or remaining space in a hard disk for storing data in a storage node.

Real-time load conditions may also include computing resource consumption in a system or a storage node. A system computing resource consumption may refer to a machine load, for example, CPU usage and other types of computing consumption. An optimal storage node may be a node that is determined or selected to be currently a most suitable node for providing storage based on the storage space remaining capacities and the consumption in system computing resources. The process of selecting the optimal storage node may be performed according to a rule.

The rule, for example, may include:

in instances when remaining capacities are the same among storage nodes in a distributed storage system, select one or more devices with small CPU occupancy rates as optimal storage nodes;

in instances when CPU occupancy rates are the same among storage nodes in a distributed storage system, select one or more storage nodes with large remaining storage capacities as optimal storage nodes;

in instances when remaining capacities and the CPU occupancy rates are different among nodes in a distributed storage system, select one or more of the storage nodes with large remaining capacities as the optimal storage nodes.

For example, suppose that there are 8 devices or storage nodes under consideration at a certain time where the remaining storage capacity of a Device 1 is 2 GB and the CPU occupancy of Device 1 is 80%. Also, the remaining storage capacities of Devices 2-8 are all 10 GB and the CPU occupancies of all Devices 2-8 are 80%. The best choice at this time according to the rule would be one of Devices 2-8. At a time when the remaining storage capacity is 2 GB and the CPU occupancy is 80% for Device 1, and the remaining storage capacities are each 0.5 GB with CPU occupancies at 40% for all Devices 2-8, the best choice would be Device 1.

However, the disclosure is not limited with regard to any specific rule for selecting a storage node to store the data in and any suitable rule or rules may be utilized. Furthermore, the rule may change according to different requirements.

In exemplary step 413, a constructed key may be generated for the data, where the constructed key may include the key corresponding to the data and node routing information corresponding to a location where the data is stored.

In some embodiments, the one or more nodes in the distributed storage system 20 that receive the data for storage may actively construct a new globally unique constructed key that may include the node routing information for a location where the data is actually stored and the key corresponding to the data and which may be referred to as the constructed key.

Specifically, information such as the key corresponding to the data and the node routing information corresponding to the location where the data is stored may be filled into a constructed key structure and may be encoded to arrive at the constructed key. In some embodiments, the constructed key may be represented in binary form when populated in the constructed key structure. The binary representation may be converted to a visible character string, for example, ASCII characters, by encoding the populated binary constructed key structure using BASE64, Punycode or UrlEncode, for example. However, the constructed key is not limited to any specific type of representation or format and any suitable type of representation or format may be utilized for the constructed key. Moreover, the binary form of the constructed key may also be directly utilized as the constructed key.

In addition to including the key corresponding to the data and the node routing information for the data, the constructed key may further include a constructed key symbol, a constructed key check field, a Cyclic Redundancy Check (CRC) check value (or a Secure Hash Algorithm (SHA) or Message Digest Algorithm 5 (MD5) value), an identity of the client, a version number of the constructed key and/or other custom information.

The constructed key symbol may be used for identifying a data structure which includes the symbol as a constructed key. The constructed key check field may be used for authenticating the constructed key. Moreover, any suitable data may be written into the constructed key structure, for example, upload time for the corresponding data, length of the corresponding data, length of a key of the corresponding data and the like. However, the constructed key is not limited to the specific information described herein. In this way, the client 10 may obtain more attributes of the data without having to perform additional communications with the distributed storage system 20.

In exemplary step 414, the constructed key for the data may be returned to the client 10 from the distributed storage system 20.

The nodes in the distributed storage system 20 that receive the data for storage form the client 10 may return the constructed key for the data to the client 10. The constructed key may serve as a certificate for the client 10 when the client reads the data from the distributed storage system 20. For example, the client 10 may download the data from the distributed storage system 20 by sending the constructed key to the distributed storage system 20. The node routing information included within the constructed key may enable the distributed storage system 20 to quickly locate one or more storage locations or positions of the stored data, upon receipt of the constructed key, without having to perform too many queries.

In operation, an embodiment of the method for data transmission may include allocating one or more storage nodes to data sent by the client 10, based on load conditions of storage nodes in the distributed storage system 20, This manner of performing storage and allocation of nodes may avoid dependence on data keys alone and uneven loading may be avoided. By actively constructing node routing information based on actual storage locations of the data and utilizing a key corresponding to the data in a new globally unique constructed key, repeated use of a data keys for different sets of data may be realized without causing conflicts when storing the data. Moreover, since the constructed key may comprise structured data, more data information may be written into the constructed key so that the client 10 may obtain additional attributes of the data without having to exchange additional communication with the distributed storage system 20. The constructed key may also serve as a certificate for the client 10 when reading the data from the distributed data system 20. Moreover, the node routing information included in the constructed key may ensure that the distributed storage system 20 may quickly locate or determine storage positions of the data, without too many queries. Therefore, the method of data transmission according to the present disclosure may avoid uneven loading and may achieve allocation of storage spaces with load balancing while maintaining a fast access to data.

Figure 5:
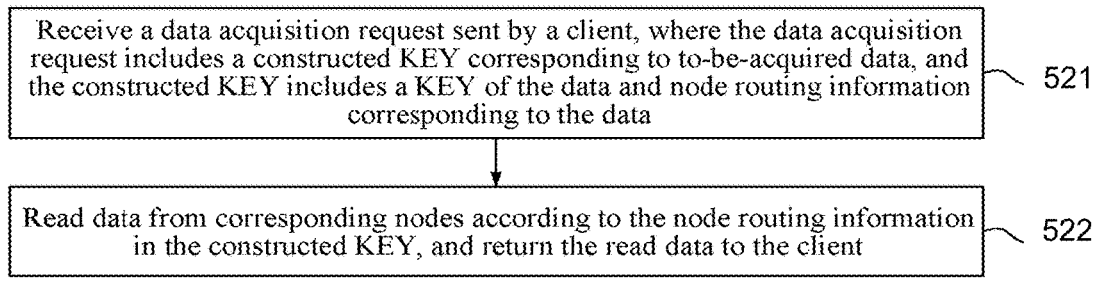
FIG. 5 is a flowchart of a method of data transmission in accordance with an embodiment of the disclosure.

FIG. 5 is a flowchart of a method for data transmission in accordance with an embodiment of the disclosure. Referring to FIG. 5, a processing procedure for the side of a distributed storage system is described when a client downloads data from the distributed storage system. As shown in FIG. 5, the method of data transmission may include exemplary steps 521 and 522.

In step 521 a data acquisition request sent by the client 10 may be received in the distributed storage system 20. The data acquisition request may include a constructed key that corresponds to the data to be acquired from the distributed storage system 20, where the constructed key may include a key corresponding to the data and node routing information corresponding to a location where the data is stored in the distributed storage system 20. The constructed key may be generated by the distributed storage system 20 when the client 10 uploads data to the distributed storage system 20 as described above.

In step 522, data may be read from nodes that correspond to the node routing information in the constructed key and the read data may be returned to the client 10.

Figure 6:
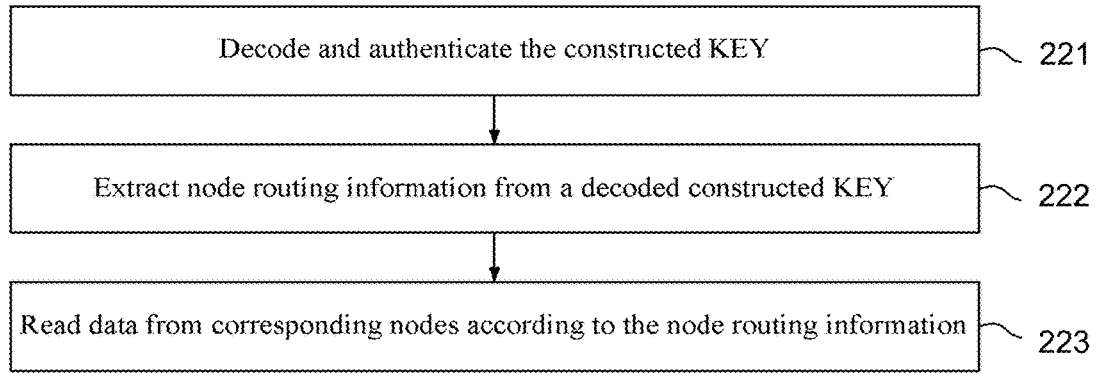
FIG. 6 is a flowchart for reading data from one or more storage nodes according to node routing information within a constructed key, in accordance with an embodiment of the disclosure.

FIG. 6 is a flowchart for reading data from one or more storage nodes according to node routing information within a constructed key, in accordance with an embodiment of the disclosure. The exemplary step 522 of FIG. 5 may include the following exemplary steps 221, 222 and 223.

Referring to FIG. 6, in step 221 the constructed key may be decoded and authenticated. For example, after receiving the constructed key sent by the client 10, the distributed storage system 20 may first confirm or determine whether or not the constructed key is a constructed key rather than another type of character string. Prior to authentication, the distributed storage system 20 may decode the received constructed key to obtain a decoded constructed key. During specific authentication, whether the decoded constructed key has a constructed key symbol can be checked. Further, a constructed key check field may be used to determine whether the constructed key has been tampered with. Further authentication may be performed according to other fields in the constructed key. The method for checking or authenticating the constructed key may vary according to different designs, as long as it can be authenticated that the received constructed key is a legitimate constructed key sent to the client 10 by the distributed storage system 20. However, a specific implementation of the present disclosure is not limited in this regard.

In step 222, the node routing information may be extracted from the decoded constructed key.

In step 223, the data may be read from the nodes corresponding to the node routing information. It should be noted that, the steps performed for receiving the data and generating the constructed key and for reading data from the nodes corresponding to the node routing information in the constructed key may be executed by a same node in the distributed storage system 20 or may be executed by different nodes respectively. The disclosure is not limited to any specific steps in this regard.

The data transmission method according to an embodiment of the present disclosure may allocate, according to load conditions of respective nodes, corresponding nodes to data sent by a client, which avoids the manner of performing storage and allocation depending on data keys, thereby avoiding the resulting problem of an uneven load; actively constructs actually stored node routing information of the data and keys of the data in a new globally unique constructed key, which avoids data query dependence on unique data keys, enabling use of repeated data keys, without worrying about data conflicts, In addition, as the constructed key is structured data, more data information can be written into it, so that the client can obtain some attributes of corresponding data without communicating with the distributed storage system; meanwhile, the constructed key may also serve as a certificate for the client to read the data subsequently, and the node routing information included in the constructed key can ensure that the storage system can fast position storage positions of the data, without too many queries. Therefore, data transmission methods of the present disclosure may avoid uneven loading, achieve allocation of storage spaces with load balancing while maintaining fast access to data.

Figure 7:
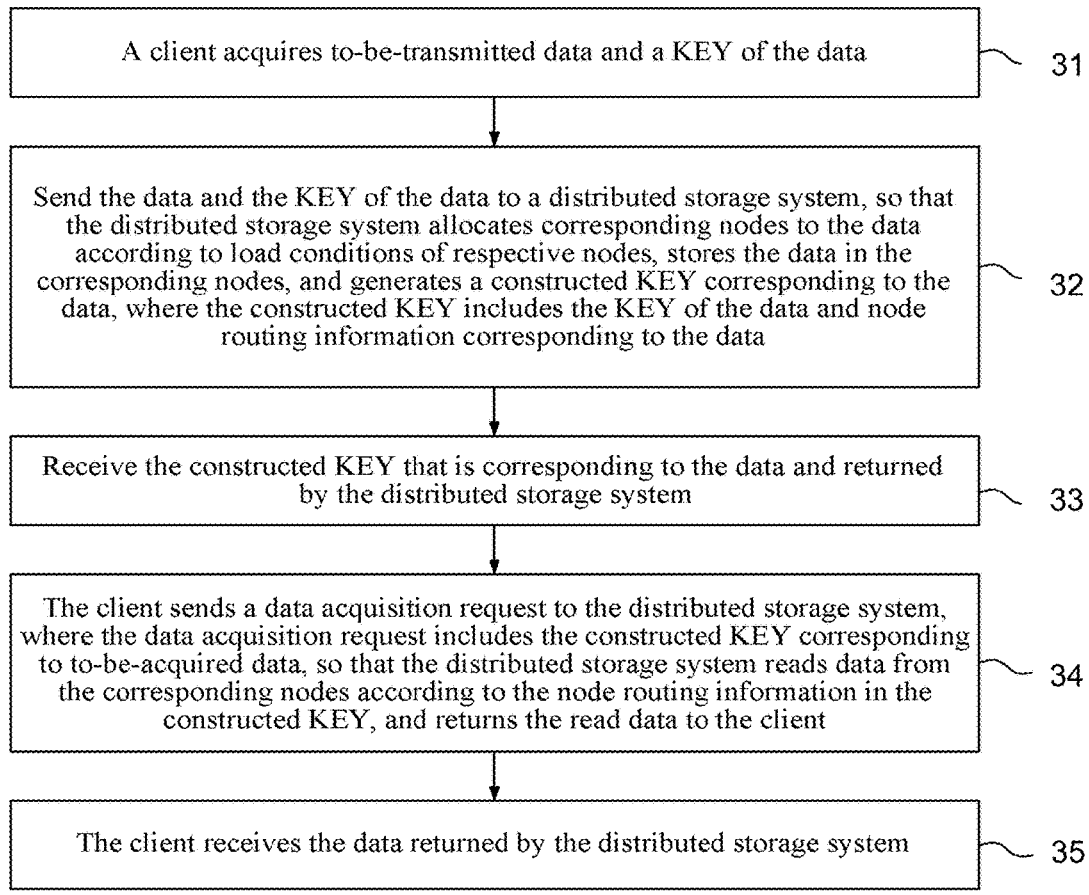
FIG. 7 is a flowchart of a method for data transmission in accordance with an embodiment of the disclosure.

FIG. 7 is a flowchart of a method for data transmission in accordance with an embodiment of the disclosure. Referring to FIG. 7, steps for a processing procedure on the client side are described with respect to steps 31, 32, 33, 34 and 35.

In step 32, the client 10 may acquire data and a key of the data.

In step 32, the data and the key of the data may be, transmitted to the distributed storage system 20, so that the distributed storage system 20 may allocate storage nodes for the data based on load conditions of the respective storage nodes. The distributed storage system may store the data in the allocated nodes, and may generate a constructed key corresponding to the data, where the constructed key may include the key of the data and node routing information corresponding to the data.

Prior to the client 10 making a request to upload data to the distributed storage system 20, the client 10 may first acquire the data that may subsequently be transmitted to or uploaded to the distributed storage system 20. For example, the client 10 may acquire the to-be-transmitted data from a local memory or a cloud memory, and then may transmit the to-be-transmitted data and the key of the data to the distributed storage system 20. Further, in instances when the client is a user terminal, a node in the distributed storage system 20, receiving data may be a server. Before sending the data, the client 10 may send a data upload request including identity authentication information to the distributed storage system 20. After the identity authentication information passes authentication, the distributed storage system 20 may return an upload response to the client 10. The client 10 may read locally stored data and a key corresponding to the data according to the upload response, and may send them to the distributed storage system 20. Alternatively, in instances when the client 10 is a server, the node receiving data in the distributed storage system 20 may be a server, or the client 10 and the node receiving data in the distributed storage system 20 may both be user terminals in a peer-to-peer network. The client 10 may acquire the to-be-transmitted data and a key corresponding to the data from a local memory according to a transmission instruction sent by the distributed storage system 20, and may then send the data and the key to one node in the distributed storage system 20. The distributed storage system 20 may allocate storage nodes to the data based on load conditions of the storage nodes in the distributed storage system 20. The distributed storage system may generate a constructed key for the data, which may include the key corresponding to the data and routing information corresponding to the data. For additional detail of the steps performed by the distributed storage system 20 after receiving the data sent by the client 10 and the key of the data, reference may be made to the steps described above with respect to FIGS. 4 and 5.

In step 33, the constructed key for the data may be and received by the client 10 from the distributed storage system. When the client 10 acquires the data from the distributed storage system 20, that is, download data, the following steps 34 and 35 may be performed.

In step 34, the client may send a data acquisition request to the distributed storage system 20, where the data acquisition request may include the constructed key for the data. The distributed storage system may read the data from the storage nodes based on the node routing information in the constructed key, and may return the read data to the client 10.

In step 35, the client 10 may receive the data returned by the distributed storage system 20.

For more detailed steps performed by the distributed storage system 20 after receiving the data acquisition request sent by the client 10, reference may be made to the steps described with respect to FIGS. 4 and 5, which are not described again here.

In operation, the method of data transmission may include allocating storage nodes in the distributed storage system 20, to the data sent by the client 10, based on load conditions of storage nodes in the storage system 20. In this manner the problems which occur when performing storage and memory allocation based on data keys and hashing algorithms such as uneven loading, may be avoided. By actively constructing known stored node routing information of the stored data with keys of the data in a new globally unique constructed key, dependence on data keys and hash values based on the data keys for locating the data, may be avoided. Furthermore, repeated use of data keys may be allowed without causing data storage conflicts. Moreover, as the constructed key comprises structured data, more information about the data may be written into the structured key, so that the client can obtain attributes of the data without having to communicate further with the distributed storage system 20. The constructed key may also serve as a certificate for the client when reading the data from the distributed storage system. The node routing information included in the constructed key may enable the storage system to quickly locate storage positions of the data, without too many queries. Therefore, the data transmission method according to the embodiments of the present disclosure can avoid the problem of uneven loading, achieve allocation of storage spaces with load balancing, and perform fast access to data.

Figure 8:
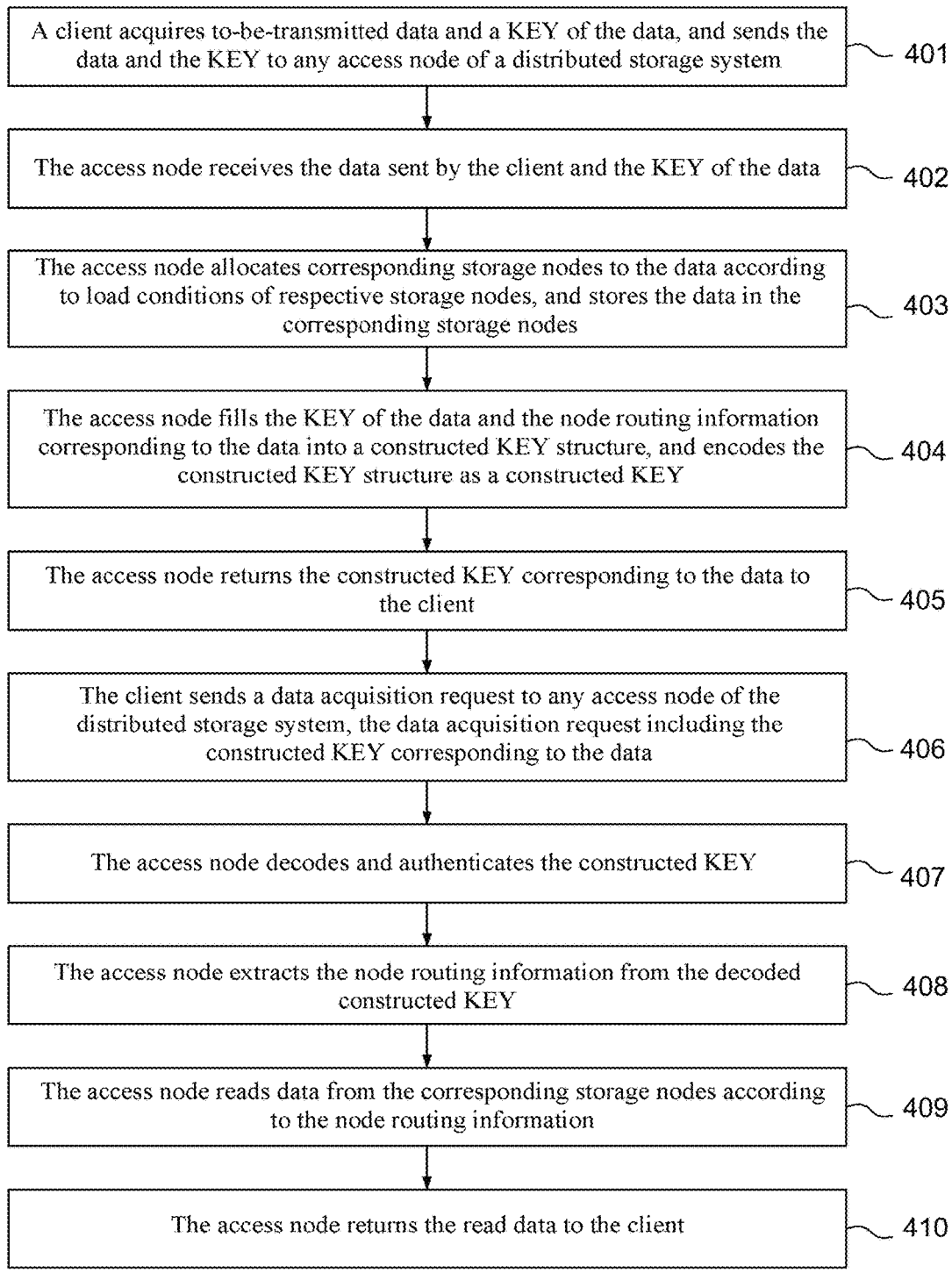
FIG. 8 is a flowchart of a method for data transmission in accordance with an embodiment of the disclosure.
Figure 9:
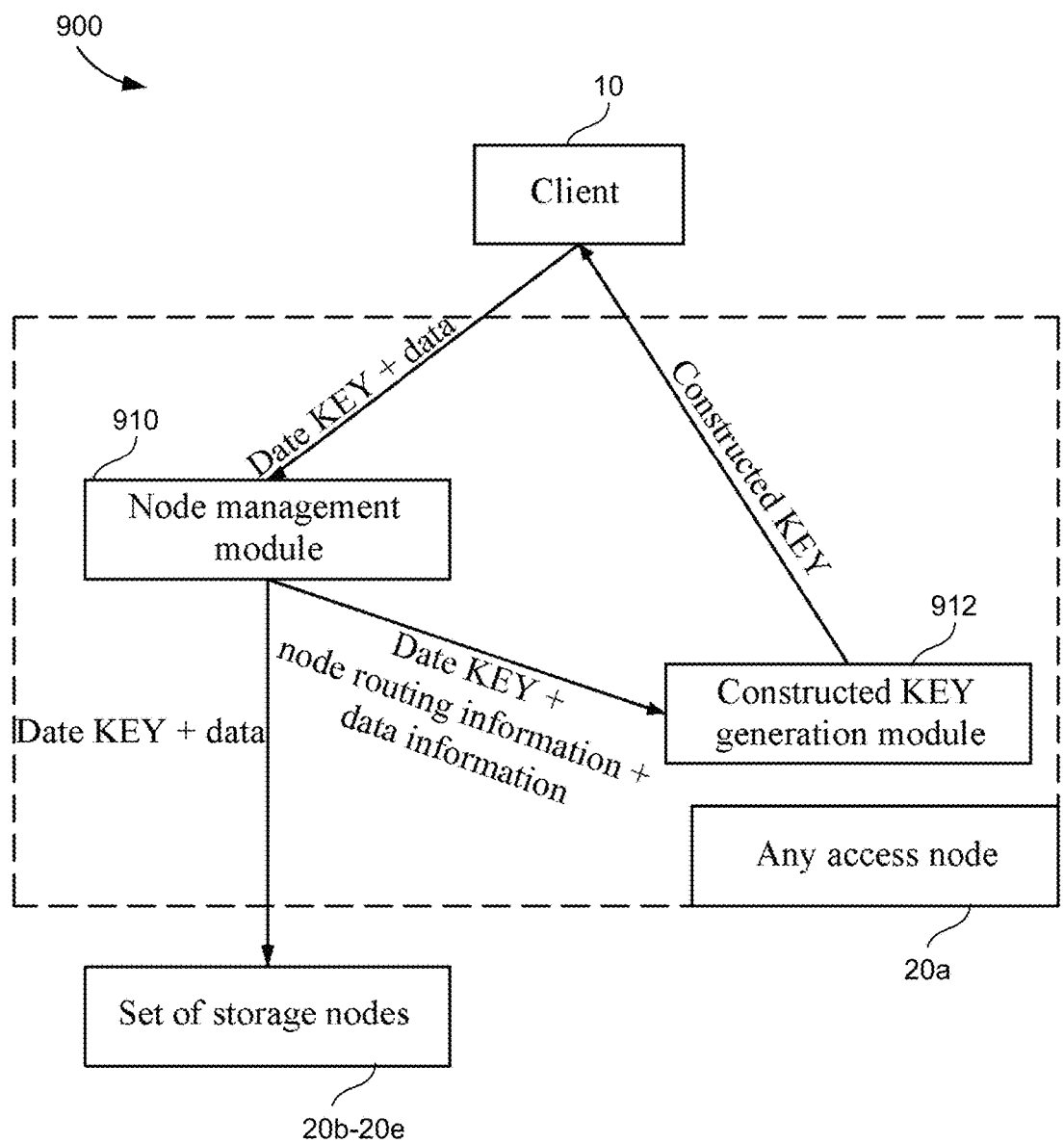
FIG. 9 is a schematic flow diagram for uploading data by a client to a distributed storage system in accordance with an embodiment of the disclosure.
Figure 10:
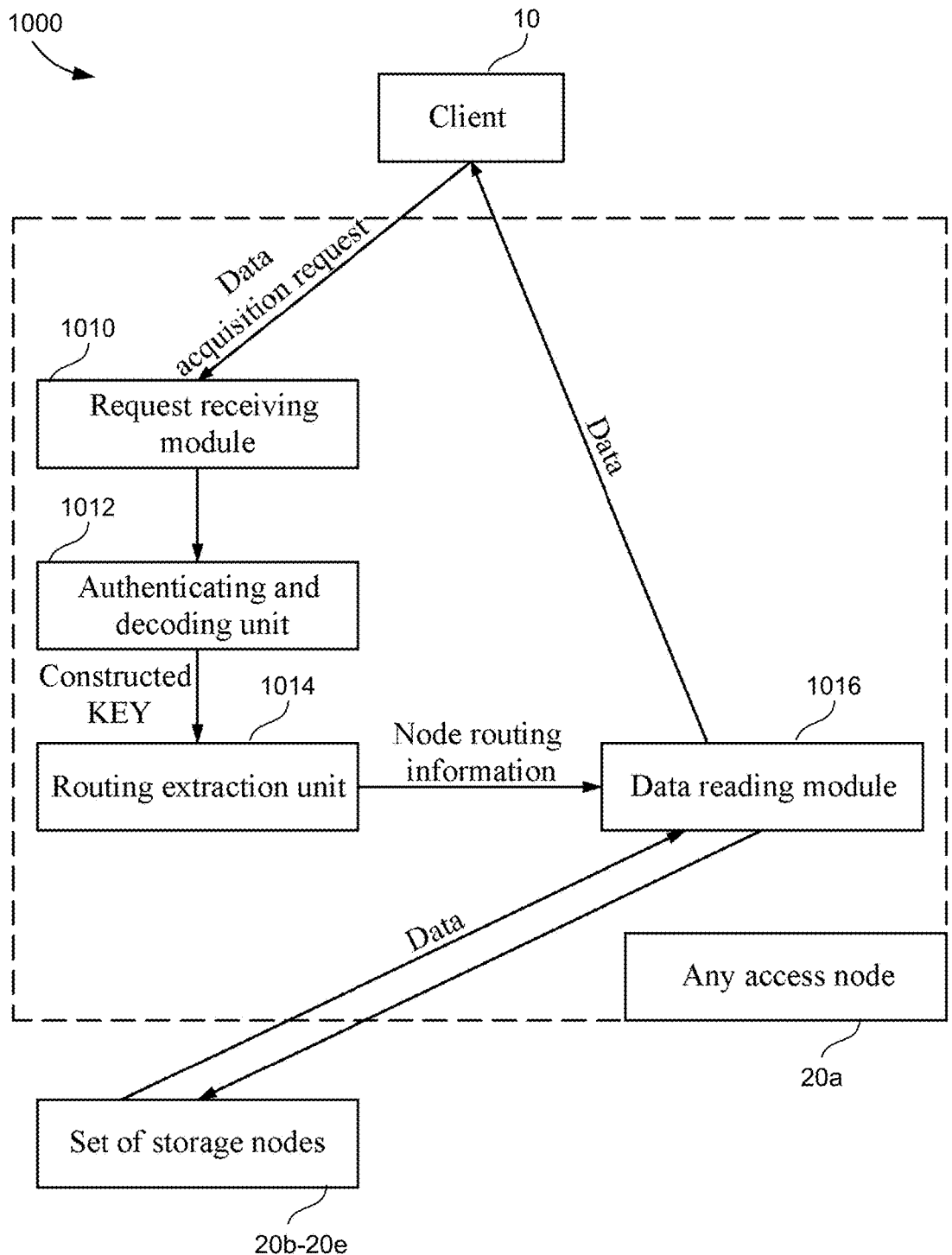
FIG. 10 is a schematic flow diagram for downloading data by a client from a distributed storage system.

The steps in the flow chart of FIG. 8 correspond to the flow diagrams of FIG. 9 and FIG. 10. FIG. 8 is a flowchart of a method for data transmission in accordance with an embodiment of the disclosure. This embodiment describes a processing procedure of mutual interaction between a client and a distributed storage system. As shown in FIG. 8, the data transmission method may include exemplary steps 401 to 405 that describe a procedure for a client uploading data to a distributed storage system. In exemplary steps 406 to 410, a procedure for a client to download data from the distributed storage system is described.

FIG. 9 is a schematic flow diagram for uploading data by a client to a distributed storage system in accordance with an embodiment of the disclosure. Referring to FIG. 9, there is shown a data transmission system 900 including the client 10, the storage nodes 20a-20e, a node management module 910 and a constructed key module 912.

In one embodiment, one or more of the nodes 20a-20e in the distributed storage system 20, for example the node 20a, may operate as an access node. One or more of the nodes 20a-20e may serve as storage nodes for data received in the distributed storage system 20. The node 20a as an access node, and/or other nodes in the distributed storage system 20 that may function as an access node, may include the node management module 910. The node management module 910 may comprise software, firmware and/or hardware that may be operable to allocate one or more of the storage nodes 20a-20e to received data according to load conditions of the storage nodes 20a-203, and may store the data in the allocated storage node. As access node, the node 20a and/or other nodes in the distributed storage system 20 may include the constructed key generation module 912. The constructed key generation module 912 may comprise software, firmware and/or hardware that may be operable to generate a constructed key for the received data, where the constructed key may include a key that corresponds to the received data and node routing information that may correspond to a location in the storage nodes 20a-20e where the data is stored. The constructed key generation module may include a data returning module that may return the constructed key for the data to the client 10.

FIG. 10 is a schematic flow diagram for downloading data to a client from a distributed storage system. Referring to FIG. 10, there is shown a data transmission system 1000, the client 10, the storage nodes 20a-20e, a request receiving module 1010, an authenticating and decoding module 1012, a routing extraction module 1014 and a data reading module 1016.

In one embodiment, one or more of the nodes 20a-20e in the distributed storage system 20, for example the node 20a, may operate as an access node. One or more of the nodes 20a-20e may serve as storage nodes for data received in the distributed storage system 20. The node 20a as an access node, and/or other nodes in the distributed storage system 20 that may function as an access node, may comprise software, firmware and/or hardware that may include the request receiving module 1010, the authenticating and decoding module 1012, the routing extraction module 1014 and the data reading module 1016. The request receiving module 1010 may be operable to receive a data acquisition requests including a constructed key from the client 10. The authenticating and decoding unit 1012 may be operable to authenticate and decode the constructed key. The extraction unit 1014 may be operable to extract node routing information from the decoded constructed key. The data reading module 1016 may be operable to read the stored data from the storage nodes according to the node routing information, and may return the read data to the client 10.

Referring to FIGS. 8 and 9, the steps 401 to 405 may be performed when the client 10 uploads data to the distributed storage system 20. In step 401, the client 10 may acquire to-be-transmitted data and a key corresponding to the data, and may send the data and the corresponding key to any access node of a distributed storage system 20, for example, the node 20a. The access node 20a may be a functional node in the distributed storage system 20 responsible for processing upload and download requests, allocation of storage for data and storage of data. There may be any suitable number of access nodes in the storage system 20. In some embodiments, the identities of respective access nodes may be equal. When making a request for uploading data, the client 10 may send the to-be-transmitted data and the corresponding key of the data to a certain access node, for example, the node 20a.

In step 402, the access node 20a may receive the data sent by the client 10 and the corresponding key of the data.

In step 403, the access node 20a may allocate one or more of the storage nodes 20a-20e to the data, according to load conditions of respective storage nodes, and may store the data in one or more of the allocated storage nodes. The allocated storage nodes may be nodes in the distributed storage system 20 that are responsible for actual data landing storage, or may be data landing nodes that may be operable to self-manage their own data. A plurality of the data landing storage nodes may form a set of storage nodes.

In step 404, the constructed key generation module 912 in the access node 20a, for example, may fill or populate a constructed key structure with the key of the data and node routing information corresponding to the location or node where the data is stored and may encode the constructed key structure to arrive at a constructed key. In some embodiments, additional information may be included with the key of the data and the node routing information in the key structure. For example, the constructed key generation module 212 may populate the key structure with length of the data, length of the data key, a CRC check value, an upload time of the data and the like, an identity of the client and a version number of a constructed key.

In some systems, a constructed key structure, for example, may be defined as:

```
{
    unsigned magic;          \\constructed key symbol;
    unsigned checksum;       \\constructed key check field;
    unsigned short version;  \\constructed key structure version number;
    unsigned timestamp;      \\upload timestamp of the data corresponding to the
                             constructed key;
    unsigned length;         \\length of the data corresponding to the constructed key;
    unsigned routing;        \\node routing information of the data corresponding to
                             the constructed key
    unsigned crc32;          \\CRC check value
    unsigned keylength;      \\data key length
    char realkey[0];         \\data key
}
```

The constructed key structure may comprise a binary form or format when filled or populated by the constructed key generation module 912. In some embodiments, the binary representation of the constructed key may be converted to a visible character string, for example, utilizing BASE64 encoding, which may be returned to the client 10. In some embodiments, the binary representation may be converted to a visible character string using encoding methods such as Punycode or UrlEncode. Moreover, in some embodiments, the binary form of the constructed key may be directly utilized as the constructed key. In this regard, the constructed key is not limited to any specific form or format and any form of constructed key may be utilized.

Furthermore, any data or information may be written into the constructed key structure according to specification or design of a constructed key and the constructed key is not limited to the information described above.

Specific node routing information stored in the constructed key may vary according to the design of different systems for routing methods for storage nodes. The routing information included in the constructed key is not limited to the unsigned form referred to in the above structure and any suitable routing information or information regarding the storage of the data may be utilized.

In step 405, the access node 20a may return the constructed key for the stored data to the client 10.

Referring to FIGS. 8 and 10, when a client downloads data from a distributed storage system, the data transmission method may include steps 406-410 of FIG. 8.

In step 406, the client 10 may send a data acquisition request to any access node of the distributed storage system 20, for example, the node 20a, where the data acquisition request may include the constructed key for the requested data.

In step 407, the access node 20a may decode and authenticate the constructed key. In some embodiments, the constructed key may be decoded before it is authenticated. In this regard, the constructed key may be decoded first, and then authentication may be performed based on the decoded content of the constructed key. For authentication of a decoded constructed key, reference may be made to the structure described with respect to step 404. It may be determined whether the constructed key structure includes a constructed key symbol. In some embodiments, a first field magic in the constructed key structure may be specified to hold a fixed value of a symbol. Each constructed key may include the symbol. The access node 20a may be operable to determine whether decoded content in received data includes a constructed key by identifying the constructed key symbol in the constructed key structure.

In instances when a constructed key symbol is detected, further authentication may be performed according to a checksum field in the constructed key. For example, prior to sending the constructed key to the client 10, a CRC value may be determined for the entire constructed key when the checksum field of the constructed key is set equal to zero. The CRC value may be populated into the checksum field of the constructed key to be sent to the client. When the client 10 attempts to acquire data from the distributed storage system 20, the distributed storage system may retrieve the checksum value from the decoded constructed key. The checksum in the constructed key may be set to zero and a CRC function may be performed on the constructed key once. The result may be compared to the known checksum value to satisfy authentication of the received constructed key.

Further, authentication may also be performed based on other fields in a constructed key. For example, it may be specified that a version number of a constructed key must be less than a certain value. In instances when the version number of a decoded constructed key is greater than the predetermined certain value, the authentication may fail. Other variations of authentication may also be utilized.

Methods utilized for checking a or authenticating a constructed key may vary according to different specifications or designs, as long as it can be verified that the received constructed key is a legitimate constructed key sent to the client 10 by the distributed storage system 20. However, the disclosure is not limited to a specific method for authenticating or verifying a constructed key.

In step 408, the access node 20a may extract the node routing information from the decoded constructed key.

In step 409, the access node 20a may read the stored data from the storage nodes according to the extracted node routing information.

In step 410, the access node 20a may return the read data to the client 10.

In operation, a request receiving module 1010 of the access node 20a may receive a data acquisition request from the client 10. The access node 20a may transmit the data acquisition request to the authenticating and decoding unit 1012 for the data reading module 1016, where the constructed key may be authenticated and decoded. The decoded constructed key may be sent to the routing extraction unit 1014 where the node routing information may be extracted from the decoded constructed key. The routing extraction unit 1014 may send the extracted routing information to the data reading module 1016, and the data reading module 1016, according to the node routing information, may read the stored data from the storage nodes corresponding to the routing information, and may return the read data to the client 10.

The method for data transmission according to the embodiments of the present disclosure may allocate storage nodes to data sent by a client 10 based on load conditions of respective storage nodes, which may avoid the manner of performing storage and allocation depending on data keys. Thereby the resulting problem of uneven load may be avoided. Actively constructing actual stored node routing information of the data and keys of the data in a new globally unique constructed key may provide improved methods over data query that depends on data keys and hash functions. The use of constructed keys enables use of repeated data keys, without data conflicts. As the constructed key comprises structured data, additional data information may be written into the constructed key so that a client may obtain attributes of the data being stored, without performing additional transactions the distributed storage system. The constructed key may also serve as a certificate for the client when reading the data subsequently from the distributed storage system. The node routing information included in the constructed key may enable the storage system to quickly locate storage positions of the data, without too many queries. Therefore, the data transmission method according to the present disclosure may avoid uneven loading, achieve allocation of storage spaces with load balancing, and maintain fast access to data.

An embodiment of the present disclosure further provides a computer storage medium, the computer storage medium may store a program, and all of, or a part of the steps of the methods described with respect to any of FIGS. 4 to 10 may be performed when the program is executed.

Figure 11:
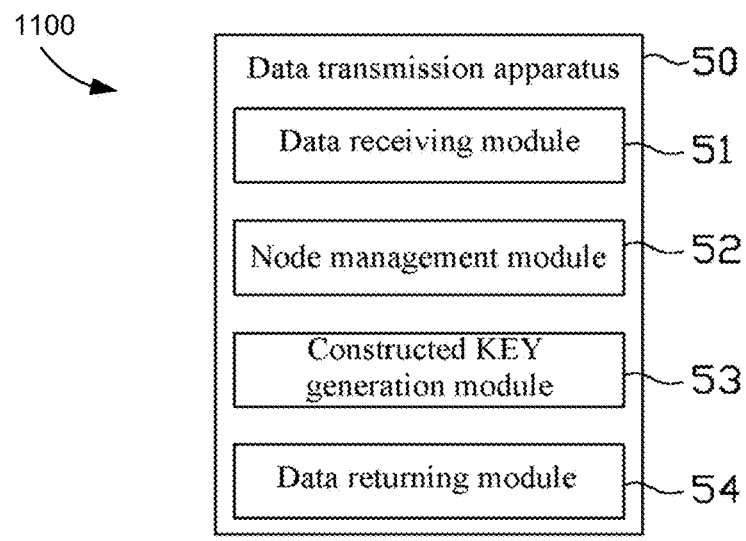
FIG. 11 is a schematic structural diagram of a data transmission apparatus in accordance with an embodiment of the disclosure.

FIG. 11 is a schematic structural diagram of a data transmission apparatus according to an embodiment of the present disclosure. Referring to FIG. 11 there is shown a data transmission system 1100 comprising a data transmission apparatus 50, a data receiving module 51, a node management module 52, a constructed key generation module 53, and a data returning module 54. The data transmission apparatus 50 may operate in the distributed storage system 20, for example, in an access node such as one or more of the nodes 20a-20e, to implement the methods described above.

The data receiving module 51 may comprise hardware and/or software that may be operable to receive data sent by a client and a key that corresponds to the data.

The node management module 52 may comprise hardware and/or software that may be operable to allocate storage nodes to the data according to load conditions of storage nodes in the distributed storage system, and store the data in the allocated storage nodes.

The constructed key generation module 53 may comprise hardware and/or software that may be operable to generate a constructed key corresponding to the data, where the constructed key may include the data key and node routing information corresponding to a location where the data may be stored data. The data returning module 54 may comprise hardware and/or software that may be operable to return the constructed key for the data to the client.

The node management module 52 may comprise hardware and/or software that may be operable to acquire real-time storage space remaining capacities and real-time system computing resource consumptions of the storage nodes in the distributed storage system 20 for storing the data. The node management module 52 may allocate one or more storage nodes to the data, based on a rule according to the real-time storage space remaining capacities and the real-time system computing resource consumptions of the respective nodes, and store the data in one or more of the allocated nodes.

The rule may include: in instances when the real-time storage space remaining capacities are the same among storage nodes, for example, the nodes 20a-20e, selecting one or more devices or nodes with small real-time system computing resource consumptions as the nodes allocated to the data. In instances when the real-time system computing resource consumptions are the same among the storage nodes, selecting one or more devices or nodes with large real-time storage space remaining capacities as the storage nodes allocated to the data. In instances when the real-time storage space remaining capacities and the real-time system computing resource consumptions are different among the storage nodes, selecting one or more of the devices or nodes with large real-time storage space remaining capacities as the storage nodes allocated to the data. In some embodiments, the selected nodes may be referred to as optimal storage nodes, for example.

Furthermore, in some embodiments the constructed key may include: a constructed key symbol, a constructed key check field, a CRC check value or an SHA or MD5 value, an identity of the client, a version number of the constructed key and/or any other suitable custom information.

The constructed key symbol may be used for identifying a data structure having a symbol as the constructed key. The constructed key check field may be used for authenticating the constructed key. Moreover, any suitable data may be written into the constructed key structure according to specification or design, for example, an upload time corresponding to the data being stored in a storage node, length of the data being stored, length of a key of the data and the like. However the information included in the constructed key is not limited to and specific type of information and any suitable information may be included. In this way, the client 10 may obtain additional attributes of the data being stored in the distributed storage system 20, without having to communicate the information separately.

In some embodiments the modules 51-54 in the data transmission apparatus 50 may comprise software code, may be stored into a memory of a device serving as a node in the distributed storage system 20. The above modules may also be implemented in hardware, for example, an integrated circuit chip. The modules may be separate or combined according to specification or design.

It should be noted that, functions performed by the modules 51-52 in the data transmission apparatus 50 may be implemented according to the methods described with respect to FIGS. 1-11, reference may be made to the descriptions above which are not repeated here again.

Figure 12:
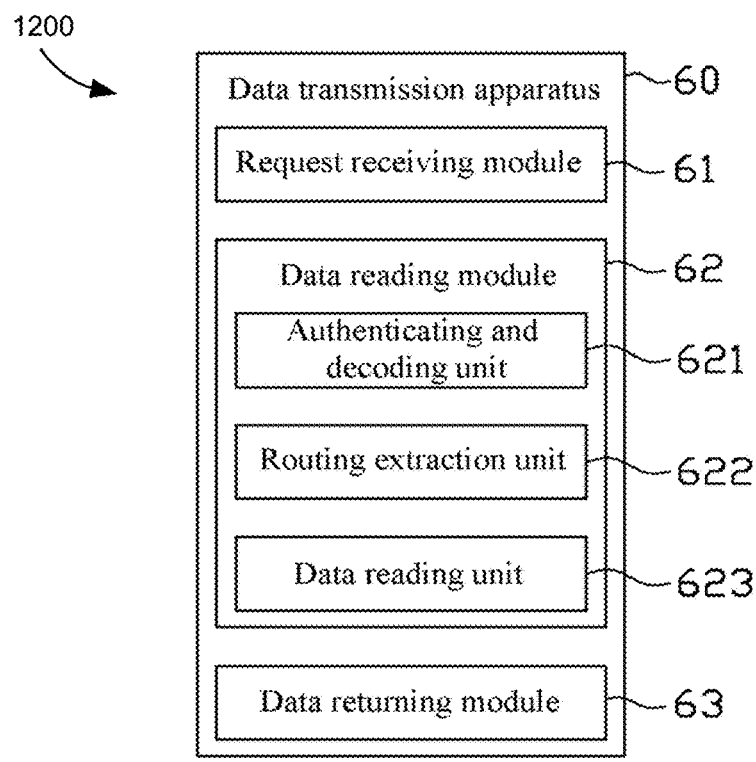
FIG. 12 is a schematic structural diagram of a data transmission apparatus in accordance with an embodiment of the disclosure.

FIG. 12 is a schematic structural diagram of a data transmission apparatus in accordance with an embodiment of the disclosure. Referring to FIG. 12, there is shown a data transmission system 1200 that may comprise a data transmission apparatus 60, a request receiving module 61, a data reading module 62, an authenticating and decoding unit 621, a routing extraction unit 622, a data reading unit 623 and a data returning module 63. The data transmission apparatus 60 may operate in the distributed storage system 20, for example, as an access node, such as one or more of the nodes 20a-20e, to implement the data transmission methods described in the above embodiments.

The request receiving module 61 may comprise hardware and/or software that may be operable to send a data acquisition request to the distributed storage system 20, where the data acquisition request may include a constructed key corresponding to the data.

The data reading module 62 may comprise hardware and/or software that may be operable to read data from the storage nodes 20a-20e according to node routing information in the constructed key.

The data returning module 63 may comprise hardware and/or software that may be operable to return the read data to the client 10.

The data reading module 62 may include the authenticating and decoding unit 621, the routing extraction unit 622 and the data reading unit 623.

The authenticating and decoding unit 621 may comprise hardware and/or software that may be operable to decode and authenticate the constructed key.

The routing extraction unit 622 may comprise hardware and/or software that may be operable to extract the node routing information from the decoded constructed key.

The data reading unit 623 may comprise hardware and/or software that may be operable to read data from storage nodes corresponding to the node routing information.

It should be noted that, the apparatus and modules described with respect to FIGS. 11 and 12 may reside and/or operate in a same node in the distributed storage system 20 or may reside and/or operate in different nodes of the distributed storage system 20. That is to say, the modules described with respect to FIGS. 11 and 12 may be combined together to run in one node of the distributed storage system 20, but the disclosure is not limited in this regard.

It should be noted that, functions performed by the modules 61-62 in the data transmission apparatus 60 may be implemented according to the methods described with respect to FIGS. 1-12, reference may be made to the related descriptions above which are not repeated here again.

Figure 13:
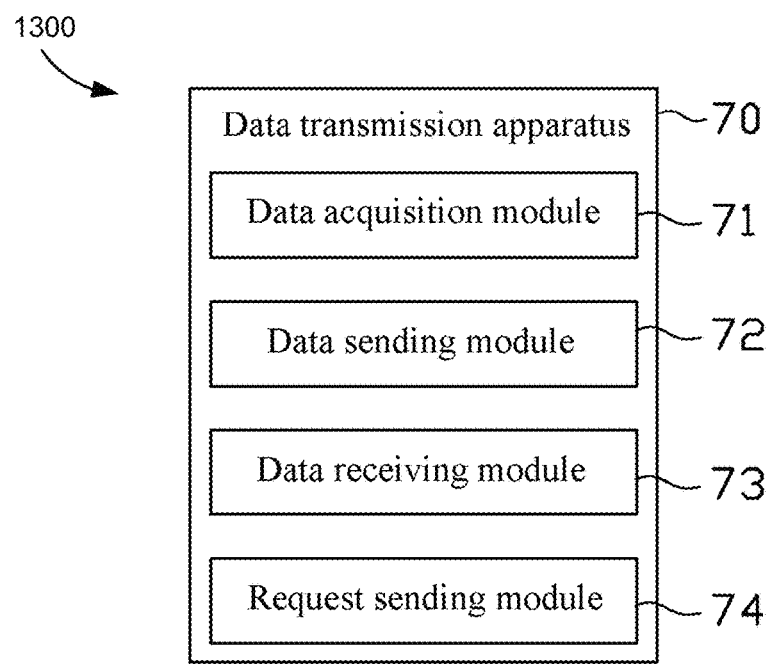
FIG. 13 is a schematic structural diagram of a data transmission apparatus in accordance with an embodiment of the disclosure.

FIG. 13 is a schematic structural diagram of a data transmission apparatus in accordance with an embodiment of the disclosure. Referring to FIG. 13, there is shown a data transmission system 1300 including a data transmission apparatus 70 a data acquisition module 71, a data sending module 72, a data receiving module 73 and a request sending module 74. The data transmission apparatus 70 may operate in the client 10 to implement the data transmission methods described in the above embodiments.

The data acquisition module 71 may comprise hardware and/or software that may be operable to acquire to-be-transmitted data and a corresponding data key.

The data sending module 72 may comprise hardware and/or software that may be operable to send the data and the corresponding data key to the distributed storage system 20, so that the distributed storage system 20 may allocate storage nodes to the data according to load conditions of respective nodes. The data may be stored in the allocated storage nodes in the distributed storage system 20. A constructed key that corresponds to the data key may be generated by the distributed storage system 20, where the constructed key may include the data key and node routing information corresponding to a location where the data is stored.

The data receiving module 73 may comprise hardware and/or software that may be operable to receive the constructed key that corresponds to the data from the distributed storage system 20. In some embodiments, the constructed key may further include: length of the corresponding data, length of a key of the corresponding data, a CRC check value, an upload time of the corresponding data, an identity of the client, a version number of the constructed key or the like.

The request sending module 74 may comprise suitable hardware and/or software that may be operable to send a data acquisition request to the distributed storage system 20, where the data acquisition request may include the constructed key corresponding to the data. The distributed storage system 20 may read the data from the corresponding nodes according to the node routing information in the constructed key, and may return the read data to the client 10.

The data receiving module 73 may further used for receiving data returned by the distributed storage system 20, where the data is read by the distributed storage system 20 from nodes corresponding to the node routing information in the constructed key.

The above modules may comprise software codes that may be stored into a memory of a device serving as a node. The above modules may also be implemented with hardware, for example, an integrated circuit chip, and the modules may be combined according to specification and/or design.

It should be noted that, functions performed by the modules 71-74 in data transmission apparatus 70 may be implemented according to methods described above with respect to FIGS. 1-13. Reference may be made to related descriptions above which are not repeated here again.

Figure 14:
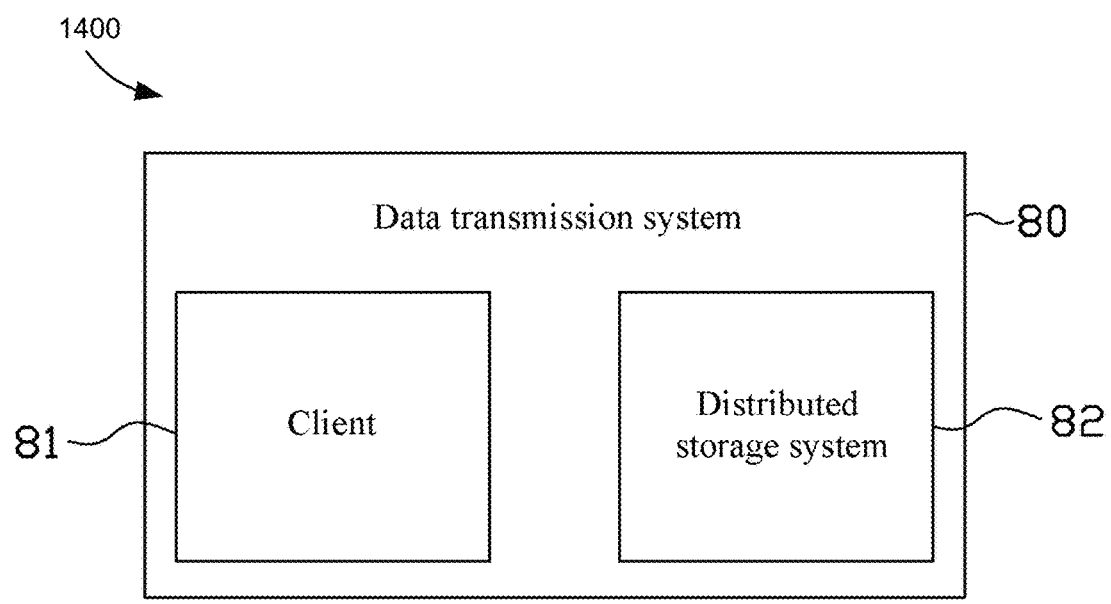
FIG. 14 is a schematic structural diagram of a data transmission system in accordance with an embodiment of the disclosure.

FIG. 14 is a schematic structural diagram of a data transmission system in accordance with an embodiment of the disclosure. Referring to FIG. 14, there is shown a data transmission system 1400 that includes the data transmission system 80, a client 81 and a distributed storage system 82.

The client 81 may be a client as described above with respect to FIGS. 1-13. For example, the client 81 may similar or substantially the same as the client 10.

The distributed storage system 82 may be a distributed storage system as described above with respect to FIGS. 1-13. For example, the distributed storage system 82 may similar or substantially the same as the distributed storage system 20. For a specific implementation function and implementation process, reference may be made to the methods described with respect to FIGS. 4 to 10 and the apparatus described with respect to FIGS. 11 to 13, which repeated here again.

In operation, the data transmission methods and apparatuses according to the embodiments of the present disclosure allocate corresponding nodes to data sent by a client according to load conditions of respective nodes, which avoid the manner of performing storage and allocation depending on data keys, thereby avoiding the resulting problem of uneven load; actively construct actually stored node routing information of the data and keys of the data in a new globally unique constructed key, which avoid the problem that data query needs to depend on data keys, and can allow existence of repeated data keys, without worrying about data conflicts; in addition, as the constructed key is structured data, more data information can be written into it, so that the client can obtain some attributes of corresponding data without communicating with the distributed storage system; meanwhile, the constructed key may also serve as a certificate for the client to read the data subsequently, and the node routing information included in the constructed key can ensure that the storage system can fast position storage positions of the data, without too many queries. Therefore, the data transmission methods and apparatuses according to the embodiment of the present disclosure can avoid the problem that a load is uneven, achieve allocation of storage spaces with load balancing, and will not affect fast access to data.

It should be noted that, the embodiments in the specification are described in a progressive manner, each embodiment focuses on describing differences between the embodiment and other embodiments, and mutual reference can be made to the same or similar parts between the embodiments. For apparatus embodiments, the description is relatively simple as it is basically similar to the method embodiments; for related contents, refer to the description of the method embodiment.

It should be noted that, herein, the relational terms such as first and second are merely used to distinguish one entity or operation from another entity or operation, but may not necessarily require or imply that the entities or operations have any such an actual relation or order therebetween. Moreover, the terms "include" and "comprise" or any other variations intend to cover non-exclusive inclusion, so that processes, methods, articles or apparatus including a series of elements not only include the elements, but also include other elements not explicitly listed, or also include inherent elements of the processes, methods, articles or apparatus. In the absence of more restrictions, for the elements defined by the expression "including one . . . ", it does not exclude that the processes, methods, articles or apparatuses including the elements also have other identical elements.

Persons of ordinary skill in the art should understand that all or a part of the steps in the above embodiments can be implemented by hardware, or may be implemented by a program instructing relevant hardware, the program may be stored in a computer readable storage medium, and the storage medium may be a read only memory (ROM), a magnetic disk, or an optical disc or any other suitable storage medium.

The above are merely exemplary embodiments that include preferred embodiments of the present disclosure, and are not intended to make any formal limitations to the present disclosure. The present disclosure has been disclosed as above through exemplary embodiments, but is not intended to be limited thereto. Any person skilled in the art may make some variations or modifications by using the technical contents disclosed above as equivalent embodiments with equivalent changes without departing from the scope of the technical solution of the present disclosure, however, any simple alterations, equivalent changes and modifications made to the embodiments according to the technical essence of the present disclosure without departing from the content of the technical solution of the present disclosure should still fall within the scope of the technical solution of the present disclosure.

What is claimed is:

1. A method for data transmission, the method comprising:
   receiving, by a distributed storage system, data sent by a client and a key corresponding to the data;
   acquiring real-time storage space remaining capacities and real-time system computing resource consumptions for storage nodes of the distributed storage system, wherein the real-time system computing resource consumptions comprise a machine load;
   allocating one or more storage nodes to the data according to a rule that is based on the real-time storage space remaining capacities and the real-time system computing resource consumptions of the storage nodes of the distributed storage system, wherein the rule comprises:
   in instances when the real-time storage space remaining capacities are substantially the same in available storage nodes, selecting one or more storage nodes with smaller real-time system computing resource consumptions relative to other of multiple storage nodes, to be utilized as the one or more storage nodes allocated to the data,
   in instances when the real-time system computing resource consumptions are substantially the same in available storage nodes, selecting one or more storage nodes with larger real-time storage space remaining capacities relative to other of the available storage nodes, to be utilized as the one or more storage nodes allocated to the data, and
   in instances when the real-time storage space remaining capacities and the real-time system computing resource consumptions are substantially different in available storage nodes, selecting one or more storage nodes with larger real-time storage space remaining capacities relative to other of the available storage nodes, to be utilized as the one or more storage nodes allocated to the data;
   storing the data in one or more allocated storage nodes;
   populating a constructed key structure, the constructed key structure comprising the key corresponding to the data, a key symbol, and node routing information relative to a location where the data is stored;
   encoding the constructed key structure to generate a constructed key for the data;
   returning the constructed key for the data to the client;
   receiving a data acquisition request sent by the client, wherein the data acquisition request comprises the constructed key for the data;
   reading the data from the one or more storage nodes according to the node routing information in the constructed key for the data; and
   returning the read data to the client.

2. The method according to claim 1, wherein the step of reading data from the one or more storage nodes according to the node routing information in the constructed key for the data comprises:
   decoding and authenticating the constructed key;
   extracting the node routing information from the decoded constructed key; and
   reading data from the one or more storage nodes according to the node routing information.

3. The method according to claim 2, wherein the step of authenticating the constructed key comprises:
   checking whether the decoded constructed key comprises a constructed key symbol, wherein the constructed key symbol is used for identifying that a data structure having the symbol is the constructed key.

4. The method according to claim 1, wherein the constructed key further comprises:
   a constructed key symbol, a constructed key check field, a Cyclic Redundancy Code (CRC) check value or an identity of the client.

5. The method according to claim 1, wherein the client performs:
   acquiring the data and the key corresponding to the data;
   sending the data and the key corresponding to the data to the distributed storage system; and
   receiving the constructed key for the data returned by the distributed storage system wherein the constructed key comprises the key corresponding to the data and the node routing information relative to a location where the data is stored.

6. The method according to claim 5, wherein the client performs:
sending the data acquisition request to the distributed storage system, wherein the data acquisition request comprises the constructed key for the data that comprises the key corresponding to the data and the node routing information relative to the location where the data is stored, and wherein the constructed key is used by the distributed storage system to read the data from the one or more allocated storage nodes according to the node routing information in the constructed key, and return the read data to the client.

7. The method according to claim 6, wherein the client performs:
receiving the data returned by the distributed storage system, wherein the data is read by the distributed storage system from one or more storage nodes based on the node routing information in the constructed key.

8. An apparatus for data transmission in a distributed storage system, the apparatus comprising:
a memory storing instructions;
a processor in communication with the memory, wherein, when the processor executes the instructions, the processor is configured to cause the apparatus to:
receive data sent by a client and a key corresponding to the data;
acquire, real-time storage space remaining capacities and real-time system computing resource consumptions for storage nodes of the distributed storage system, wherein the real-time system computing resource consumptions comprise a machine load;
allocate one or more storage nodes to the data according to a rule that is based on the real-time storage space remaining capacities and the real-time system computing resource consumptions of the storage nodes of the distributed storage system, wherein the rule comprises:
in instances when the real-time storage space remaining capacities are substantially the same in available storage nodes, selecting one or more storage nodes with smaller real-time system computing resource consumptions relative to other of multiple storage nodes, to be utilized as the one or more storage nodes allocated to the data,
in instances when the real-time system computing resource consumptions are substantially the same in available storage nodes, selecting one or more storage nodes with larger real-time storage space remaining capacities relative to other of the available storage nodes, to be utilized as the one or more storage nodes allocated to the data, and
in instances when the real-time storage space remaining capacities and the real-time system computing resource consumptions are substantially different in available storage nodes, selecting one or more storage nodes with larger real-time storage space remaining capacities relative to other of the available storage nodes, to be utilized as the one or more storage nodes allocated to the data;
populate a constructed key structure, the constructed key structure comprising the key corresponding to the data, a key symbol, and node routing information relative to a location where the data is stored;
encode the constructed key structure to generate a constructed key for the data;
return the constructed key for the data to the client;
receive a data acquisition request sent by the client, wherein the data acquisition request comprises the constructed key for the data;
read the data from the one or more storage nodes according to the node routing information in the constructed key; and
return the read data to the client.

9. The apparatus according to claim 8, wherein, when the processor is configured to cause the apparatus to read the data from the one or more storage nodes according to the node routing information in the constructed key, the processor is configured to cause the apparatus to:
decode and authenticate the constructed key;
extract the node routing information from the decoded constructed key; and
read the data from the one or more storage nodes according to the node routing information.

10. The apparatus according to claim 9, wherein, when the processor is configured to cause the apparatus to read the data from the one or more storage nodes according to the node routing information in the constructed key, the processor is configured to cause the apparatus to:
check whether the decoded constructed key comprises a constructed key symbol, wherein the constructed key symbol is used for identifying that a data structure having the symbol is the constructed key.

11. The apparatus according to claim 8, wherein the constructed key further comprises:
a constructed key symbol, a constructed key check field, a Cyclic Redundancy Check (CRC) check value, or an identity of the client.

12. An apparatus for data transmission in a client, the apparatus comprising:
a memory storing instructions;
a processor in communication with the memory, wherein, when the processor executes the instructions, the processor is configured to cause the apparatus to:
acquire data to be transmitted and a key corresponding to the data;
send the data and the key corresponding to the data to a distributed storage system, wherein the distributed storage system is configured to:
acquire, real-time storage space remaining capacities and real-time system computing resource consumptions for storage nodes of the distributed storage system, wherein the real-time system computing resource consumptions comprise a machine load;
allocate one or more storage nodes to the data according to a rule that is based on the real-time storage space remaining capacities and the real-time system computing resource consumptions of the storage nodes of the distributed storage system, wherein the rule comprises:
in instances when the real-time storage space remaining capacities are substantially the same in available storage nodes, selecting one or more storage nodes with smaller real-time system computing resource consumptions relative to other of multiple storage nodes, to be utilized as the one or more storage nodes allocated to the data,
in instances when the real-time system computing resource consumptions are substantially the same in available storage nodes, selecting one or more storage nodes with larger real-time storage space remaining capacities relative to other of the available storage nodes, to be utilized as the one or more storage nodes allocated to the data, and in instances when the real-time storage space remaining capacities and the real-time system computing resource consumptions are substantially different in available storage nodes, selecting one or more storage nodes with larger real-time storage space remaining capacities relative to other of the available storage nodes, to be utilized as the one or more storage nodes allocated to the data;

store the data in one or more allocated storage nodes;

populate a constructed key structure, the constructed key structure comprising the key corresponding to the data, a key symbol, and node routing information relative to a location where the data is stored;

encode the constructed key structure to generate a constructed key for the data;

receive the constructed key for the data returned by the distributed storage system; and send a data acquisition request to the distributed storage system, wherein the data acquisition request comprises the constructed key for the data, and wherein the distributed storage system reads the data from the one or more storage nodes according to the node routing information in the constructed key, and returns the read data to the client.

13. The apparatus according to claim 12, wherein, when the processor executes the instructions, the processor is further configured to cause the apparatus to:

receive the data returned by the distributed storage system.

* * * * *